United States Patent [19]

Dube

[11] 3,909,277

[45] Sept. 30, 1975

[54] LEAD CONTAINING CERAMIC COMPOSITIONS WHICH FURTHER CONTAIN A LEAD RELEASE INHIBITING AMOUNT OF A CHROMIUM COMPOUND

[75] Inventor: Alfred Dube, Collingwood, Canada

[73] Assignee: Heritage Silversmiths Limited, Toronto, Canada

[22] Filed: June 26, 1973

[21] Appl. No.: 373,742

[30] Foreign Application Priority Data
June 26, 1972 United Kingdom............... 29748/72

[52] U.S. Cl. ...................... 106/49; 106/53; 106/71
[51] Int. Cl.² ....................... C03C 5/02; C03C 3/10
[58] Field of Search............................. 106/49, 53, 71

[56] References Cited
UNITED STATES PATENTS
748,851  1/1904  Duncan................................ 106/49

*Primary Examiner*—Patrick P. Garvin
*Assistant Examiner*—Mark Bell
*Attorney, Agent, or Firm*—Sim & McBurney

[57] ABSTRACT

Lead release from copper oxide colored- and lead oxide- containing glazes for pottery is lowered by incorporation in the glass of a small amount of certain chromium compounds, particuarly earth metal chromates.

20 Claims, No Drawings

LEAD CONTAINING CERAMIC COMPOSITIONS WHICH FURTHER CONTAIN A LEAD RELEASE INHIBITING AMOUNT OF A CHROMIUM COMPOUND

FIELD OF INVENTION

This invention relates to ceramic compositions, more particularly to glass compositions for use in glazing pottery.

BACKGROUND TO THE INVENTION

Most pottery items have a finishing outer glaze, frequently highly colored in distinctive manner. The glaze commonly is formed from a low melting point glass frit composed of a plurality of glass-making materials. Many such frits contain substantial quantities of lead oxide, the particular quantity being dependent on a number of factors, such as, the nature of other ingredients in the frit and the melting temperature desired.

Coloring oxides are usually included in the glaze, the particular oxides and quantities chosen being dependent on the external appearance desired. The present invention is directed to compositions which contain copper oxide as the coloring oxide, giving a green color to the glaze. Such copper oxide is incorporated into the frit by the use of copper oxide-incorporating components, for example, cupric carbonate, cuprous carbonate, cuprous oxide or cupric oxide. The presence of such copper oxide in all but trace quantities leads to an imperfect glass solution in which there is a tendency for lead oxide to be rejected.

While many glazes which contain coloring oxides do not exhibit this phenomenon, copper oxide-containing glazes also containing lead oxide tend to exhibit "lead release." By lead release in this specification is meant the ability of quantities of the lead oxide to be drawn from the glaze by acidic materials contacting the glaze-surface.

Many pottery items are utilized for the holding, storing or serving of food items, and many food items contain reactants which are capable of removing lead from a glaze prone to lead release. Typical pottery items are cups, mugs, pitchers, plates, etc. The release of lead from glazes formed on the surface of these items may ultimately lead to lead poisoning of the individual.

The release of lead from glass-like materials and the possible health hazard have been recognized by the North American Governments and strict regulations have been enacted governing permitted levels of lead release. The lead release of glazes is determined in the United States by a standard procedure, as follows;

The item to be tested is washed in detergent, rinsed with distilled water and dried. The item is filled to capacity, or otherwise contacted, with a 4% solution of acetic acid and left to stand at room temperature (approximately 72°F) for a period of 24 hours. At the end of this time, the acetic acid solution is removed and subject to analysis for lead content, typically using atomic absorption techniques.

In the testing employed in the present invention, a Unicam Model SP90A Series 2 atomic absorption spectrophotometer was employed. The conditions were:

| | |
|---|---|
| Wavelength | 217 nm |
| Slit width | 0.05 nm |
| Oxygen flow rate | 5 litres/min. |
| Acetylene flow rate | 1000 to 1600 cc/min. |

To conform with U.S. and similar Canadian regulations, it is necessary that the quantity of lead measured be less than 7 parts per million.

SUMMARY OF INVENTION

The present invention is concerned with reducing lead release from lead oxide- and copper oxide-containing glazes. The invention is not limited to glazes although the invention will be described hereinafter with particular reference to glazes, and is applicable to other glass-like materials, including glasses, enamels and ceramic pigments.

In a particular embodiment of the present invention, compositions are provided which exhibit lead release conforming to the above-mentioned regulations.

The quantity of lead which is released from lead oxide-and copper oxide-containing glass compositions increases sharply with increasing quantities of copper oxide. The present invention is directed to reducing the lead release from glass compositions formed from glass forming components to provide up to about 3% copper oxide, up to about 40% lead oxide, substantial quantities of silica and minor quantities of fluxing oxides in the composition.

In accordance with the present invention, it has been surprisingly found that the incorporation of a small quantity of a particular chromium compound as described hereinafter in more detail, in the glass-forming components substantially reduces the quantity of lead release from the above described composition.

DETAILED DESCRIPTION OF INVENTION

In particular, it has been found that the incorporation of a small quantity of an alkaline earth chromate, such as barium chromate, calcium chromate and strontium chromate, in the glaze substantially reduces the lead release therefrom.

Other chromates also may be used, including iron chromate, cobalt chromate, silver chromate and cupric chromate. A further chromium compound which may be utilized is chromic oxide.

In the formation of a glaze on a pottery item, the commonly-practised procedure is to form a basic glass frit, mix the frit with coloring ingredients, in the present invention a copper oxide-providing material and other modifiers, clay and water to form a slip. The pottery item is dipped in the slip and fired. This procedure may be used in the present invention and the chromium compound may be added during the formation of the slip. Typically the amount of clay may be from 5 to 15%, preferably about 10%, by weight of the solid components of the slip.

In general, larger quantities of chromium compound result in lower lead release values, silver chromate being the reverse and iron chromate passing through an effectiveness peak. However, above certain levels, the chromium compound causes visible defects in the finished glaze and hence is unsatisfactory. Usually, the quantity of chromium compound is below about 1% by weight of the total glass-forming composition, typically about 0.25 to about 0.75% by weight.

The present invention is applicable to a wide range of lead oxide- and copper oxide-containing glazes, wherein the quantity of lead oxide does not exceed about 40% and the quantity of copper oxide does not exceed 3%. Silica represents the bulk, and possibly all, of the remainder of the glass. Usually small quantities of fluxing components, commonly used in glass compositions, are present. Among the fluxing components which may be present are calcium oxide, magnesium oxide, boron oxide, soda, potassia, lithia, zinc oxide and strontium oxide. Other glass-modifying components, for example, aluminia, zirconia, antimony oxide, and titania may be present in the glass. Typically, up to about 10% of non-silica components may be used, with a total of up to about 25% of fluxing components being present. In formulating compositions for the formation of glazes, it is preferred that the glaze has expansion properties substantially the same as those of the material on which the glaze is to be formed to minimize stress cracking on firing or cooling.

The quantity of lead oxide in the glaze may vary over a wide range, typically from about 10 to about 37% of the glaze composition. The quantity of copper oxide may vary from about 1 to about 3%, preferably about 1 to about 2%. At copper oxide quantities above about 3%, it is not possible to achieve significant lowering of lead release by the incorporation of chromium compounds below levels of incorporation above which visible defects in the glaze result.

In a particular aspect of the present invention, a glaze containing such a quantity of lead oxide contains copper oxide provided from about 3% by weight of the glaze forming components of copper carbonate with about 0.5 to 0.75% by weight of calcium or strontium chromate incorporated in the glass-forming composition. Compostions of this type have a distinctive green color and exhibit lead release values conforming to the amount regulations outlined above.

It has been known to incorporate chromium oxide in glazes but such inclusion has been for the purpose of coloring the glaze only. In the glazes of the present invention, copper oxide is the coloring component, the small quantities of chromate included have little or substantially no effect on the coloring of the finished product. Heretofore, there has been no suggestion that small quantities of chromium compounds may be used to reduce lead releases from copper oxide- colored glass compositions.

The mode of addition of the chromate to the glass-like material clearly depends on the particular glass-like material and the ultimate end form of the product.

EXAMPLES

The invention is illustrated by the following examples:

EXAMPLE 1

A glaze of the following composition was formed:

|  | % |
|---|---|
| PbO | 28.22 |
| $SiO_2$ | 34.75 |
| $Al_2O_3$ | 6.55 |
| CaO | 4.95 |
| $B_2O_3$ | 6.91 |
| $Na_2O$ | 5.56 |
| $CuCO_3$ | 3.01 |
| E.P.K China Clay | 10.05 |
|  | 100.00 |

This glaze was fired on pottery items to a temperature equivalent to Large Orton Cone No. 05 and, upon testing the items in accordance with the procedure outlined above, exhibited an average lead release value of 38.6 ppm.

To the glaze were added small quantities of barium chromate and the firing and testing procedure were repeated. Substantially no visible difference in appearance of the glaze could be discerned. The lead release results are reproduced in the following Table I:

TABLE I

| % Addition[1] of Barium Chromate | Lead Release Average (ppm) |
|---|---|
| 0.251 | 29.4 |
| 0.503 | 10.8 |
| 0.754 | 3.5 |

[1]The percentage barium chromate additions were calculated on the dry weight of the glaze ingredients and added over and above the weight of the glaze.

It will be seen from the above Table I that the addition of only a very small quantity of barium chromate reduced the lead release and the addition of as small a quantity as 0.754% of the barium chromate reduced the level of lead release below the level required by U.S. and Canadian regulations.

EXAMPLE II:

Example I was repeated with the same although a different source of copper carbonate was utilized. The resulting glaze had an average lead release of 13.3 ppm. Various quantities of chromates and chromium oxides were included with the glaze ingredients and the average lead release was determined in each case by the above procedure. Again, there was substantially no visible difference in the appearance of the glaze. The lead release results are reproduced in the following Table II:

TABLE II

| Additive | Lead Release | | |
|---|---|---|---|
|  | 0.25% | 0.50% | 0.75% |
| Barium chromate | 18 | 7.4 | 4.1 |
| Calcium chromate | 4.9 | 4.2 | 0.8 |
| Strontium chromate | 7.5 | 1.5 | 0.2 |
| Iron chromate | 6.1 | 0.8 | 10.4 |
| Cobalt chromate | 13.2 | 8.3 | 5.4 |
| Silver chromate | 3.4 | 8.2 | 12.4 |
| Chromic oxide | 13(0.2%) | 7.3(0.38%) | 4.6 |
| Cupric chromate | 12.1 | 14.9 | 7.8 |
| Lead chromate | 71.7 | 61 | 69 |
| Zinc chromate | 8.7 | 17.1 | 16.4 |

It will be seen from the above Table II that the lowest lead releases are attainable with 0.75% of calcium chromate and strontium chromate. In addition, iron chromate shows decreasing lead release with increasing quantities to about 0.50%, where the lead release is comparable to that achieved with 0.75% of calcium chromate, and then the lead release value increases markedly between addition of 0.50 and 0.75% of iron chromate.

The results in Table II also indicate that barium chromate is effective in reducing lead release at additions of 0.50 and 0.75%, but ineffective at additions of 0.25%. Silver chromate is anomalous in that, while a reduction in lead release is achieved, the lead release increased with increasing addition of silver chromate, in contrast to the majority of the chromates.

Effective lead release decrease is achieved only by addition of 0.50 and 0.75% of cobalt chromate while cupric chromate is ineffective at all the tested values except 0.75%. Similarly, only marginal effectiveness is achieved by the addition of 0.25% of zinc chromate, higher levels being ineffective by way of contact, the addition of lead chromate was completely ineffective.

The results of Table II indicate therefore that certain chromium compounds in certain quantities are effective in reducing lead release in certain glazes without visibly changing the appearance of the glaze.

EXAMPLE III:

Example II was repeated except that the glaze was prepared with 4.0 and 5.0% $CuCO_3$. The average lead release in each case, both with and without the addition of 0.75% barium chromate was measured and the results are reproduced in the following Table III:

TABLE III

| % $CuCO_3$ | Lead Release | With Barium Chromate |
|---|---|---|
| | 0 | 0.75 |
| 4.0 | 31.8 | 4.2 |
| 5.0 | 59.5 | 40.9 |

These results indicate that the lead release of glazes formed from up to 5% of copper carbonate can be reduced with certain quantities of barium chromate.

Modifications are possible within the scope of the invention.

What I claim is:

1. In a lead-releasing colored ceramic composition formed from a plurality of glass-forming components including a copper oxide-providing material present in an amount sufficient to provide up to about 3% by weight of copper oxide based on the total weight of the composition, a lead oxide-providing material present in an amount sufficient to provide up to about 40% by weight of lead oxide based on the total weight of the composition, at least one fluxing oxide-providing material present in sufficient amount to provide up to about 25% by weight of fluxing oxides, and a silica-forming material present in an amount sufficient to provide the balance by weight of the glass-forming components of silica, the improvement which comprises adding to said plurality of glass-forming components a chromium compound selected from the group consisting of barium chromate, calcium chromate, strontium chromate, iron chromate, cobalt chromate, silver chromate, cupric chromate, zinc chromate and chromic oxide, said chromium compound being added in an amount sufficient to effect a lead release of less than 7 ppm and in an amount insufficient to alter substantially the color and visual appearance of said composition in the absence of such chromium compound.

2. The composition of claim 1, wherein said chromium compound is present in an amount of less than about 1% by weight of said plurality of components.

3. The composition of claim 1, wherein said chromium compound is present in an amount of from about 0.25 to about 0.75% by weight of the total weight of said plurality of components.

4. The composition of claim 1, wherein said chromium compound is selected from strontium chromate and calcium chromate present in an amount of from about 0.25 to about 0.75% by weight.

5. The composition of claim 1, wherein said chromium compound is barium chromate present in an amount of from about 0.50 to about 0.75% by weight.

6. The composition of claim 1, wherein said chromium compound is iron chromate present in an amount of from about 0.25 to about 0.50% by weight.

7. The composition of claim 1, wherein said chromium compound is cobalt chromate present in an amount of from about 0.50 to about 0.75% by weight.

8. The composition of claim 1, wherein said chromium compound is silver chromate present in an amount of about 0.25 to about 0.50% by weight.

9. The composition of claim 1, wherein said chromium compound is cupric chromate present in an amount of about 0.75% by weight.

10. The composition of claim 1, wherein said chromium compound is zinc chromate present in an amount of about 0.25% by weight.

11. The composition of claim 1, wherein said chromium compound is chromium oxide present in an amount of from about 0.38 to about 0.75%.

12. The composition of claim 1, wherein said copper oxide-providing material is cupric carbonate present in an amount of less than 5% by weight of said components.

13. The composition of claim 12, wherein said cupric carbonate is present in an amount from about 2% to about 4% by weight of said components.

14. The composition of claim 1 wherein said copper oxide-providing material is cuprous oxide or cupric oxide present in an amount of from about 1 to about 3% by weight of said components.

15. The composition of claim 1, wherein said colored ceramic composition is formed from a plurality of glassforming components including copper carbonate present in an amount from about 2 to about 3% by weight of said components, a lead oxide-providing material present in an amount sufficient to provide about 10 to about 37% by weight of the total weight of said composition of lead oxide.

16. The composition of claim 15, wherein said chromium compound is calcium chromate present in an amount of about 0.75% by weight of said components.

17. The composition of claim 15 wherein said chromium compound is strontium chromate present in an amount of about 0.50 to 0.75% by weight of said components.

18. The composition of claim 15 wherein said chromium compound is iron chromate present in an amount of about 0.50% by weight of said composition.

19. A glaze forming aqueous slip for pottery, said glaze after firing having a lead release less than 7 ppm, comprising:
   a. water;
   b. about 72 to 90% by weight of total solids of a particularized uncolored glass frit containing about 10 to about 37% by weight of lead oxide;
   c. from about 2% to about 3% by weight of total solids of powder copper carbonate;
   d. about 5 to about 15% by weight of clay in particulate form; and
   e. less than 1% by weight of the total solids weight of components (b), (c) and (d) of a chromium compound selected from the group consisting of:
      i. about 0.25 to about 0.75% by weight of calcium chromate;
      ii. about 0.50 to about 0.75% by weight of barium chromate;
      iii. about 0.25 to about 0.75% by weight of strontium chromate;

iv. about 0.25 to about 0.50% by weight of iron chromate;
v. about 0.25% to about 0.50% by weight of silver chromate, and
vi. about 0.50% to about 0.75% by weight of cobalt chromate.

20. The slip of claim 19 wherein said glaze has a coefficient of expansion substantially that of the pottery.

* * * * *